US008539346B2

(12) United States Patent (10) Patent No.: US 8,539,346 B2
Albornoz et al. (45) Date of Patent: *Sep. 17, 2013

(54) ASSOCIATING ANNOTATIONS WITH DOCUMENT FAMILIES

(75) Inventors: Jordi A. Albornoz, Cambridge, MA (US); Lee D. Feigenbaum, Brookline, MA (US); Douglas R. Fish, Rochester, MN (US); Sean J. Martin, Cambridge, MA (US); Hoa T. Tran, Rocehster, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

This patent is subject to a terminal disclaimer.

(21) Appl. No.: 12/126,167

(22) Filed: May 23, 2008

(65) Prior Publication Data

US 2008/0222512 A1 Sep. 11, 2008

Related U.S. Application Data

(62) Division of application No. 11/016,221, filed on Dec. 17, 2004.

(51) Int. Cl.
*G06F 17/00* (2006.01)
(52) U.S. Cl.
USPC ............................ 715/255; 715/233; 715/230
(58) Field of Classification Search
USPC .......................................... 715/255, 233, 230
See application file for complete search history.

(56) References Cited

U.S. PATENT DOCUMENTS

| 5,999,182 | A | 12/1999 | Etchemendy et al. |
| 6,092,074 | A | 7/2000 | Rodkin et al. |
| 6,484,156 | B1 | 11/2002 | Gupta et al. |
| 6,519,603 | B1 | 2/2003 | Bays et al. |
| 6,571,295 | B1 | 5/2003 | Sidana |
| 6,687,877 | B1 | 2/2004 | Sastry et al. |
| 6,687,878 | B1 | 2/2004 | Eintracht et al. |
| 6,871,318 | B1 | 3/2005 | Wynblatt et al. |
| 6,956,593 | B1 | 10/2005 | Gupta et al. |
| 6,996,558 | B2 | 2/2006 | Dettinger et al. |
| 2002/0124018 | A1 | 9/2002 | Fifield et al. |
| 2003/0172056 | A1 | 9/2003 | Dettinger et al. |
| 2003/0196164 | A1 | 10/2003 | Gupta et al. |
| 2004/0111668 | A1 | 6/2004 | Cragun et al. |

(Continued)

OTHER PUBLICATIONS

Electrical Schematics Page, Apr. 25, 2002, http://www.jlab.org/accel/inj_group/elec1.htm.

(Continued)

*Primary Examiner* — Cesar B Paula
*Assistant Examiner* — Nathan Hillery
(74) *Attorney, Agent, or Firm* — Patterson & Sheridan LLP

(57) ABSTRACT

The present invention generally provides methods, systems, and articles of manufacture for managing an annotation system that includes storing annotations for a document family, i.e., a series of versions of a data source. Annotations created for one version of the data source may be viewed in context from both subsequent and prior versions of the same data source. Embodiments of the invention associate annotations with both a data source "family identifier" as well as a "version identifier." Other than adding a family ID to the data source, the data source remains unchanged. The family ID is maintained across different versions of the data source, whereas version IDs are determined for a specific version of the data source. Version IDs can be constructed from each data source directly, and do not need to be stored.

7 Claims, 9 Drawing Sheets

(56) References Cited

U.S. PATENT DOCUMENTS

| | | |
|---|---|---|
| 2004/0138946 A1 | 7/2004 | Stolze |
| 2004/0150669 A1 | 8/2004 | Sabiers et al. |
| 2004/0163042 A1 | 8/2004 | Altman |
| 2004/0205542 A1 | 10/2004 | Bargeron et al. |
| 2004/0260714 A1 | 12/2004 | Chatterjee et al. |
| 2005/0216828 A1 | 9/2005 | Brindisi |
| 2005/0256866 A1 | 11/2005 | Lu et al. |

OTHER PUBLICATIONS

Naser Barghouti, Stephen North, "Improvise—A Process Modeling Interface With Multimedia Graph Diagrams," ACM Multimedia '95, http://cs.uic.edu/~ifc/mmwsproc/north/north.html.

ASSOCIATING ANNOTATIONS WITH DOCUMENT FAMILIES

CROSS-REFERENCE TO RELATED APPLICATIONS

This application is a divisional of co-pending U.S. patent application Ser. No. 11/016,221, filed Dec. 17, 2004, which is hereby incorporated by reference in its entirety.

BACKGROUND OF THE INVENTION

1. Field of the Invention

The present invention generally relates to data management. More particularly, the present invention relates to managing annotations stored for a one version of a data source and making the annotations available to other versions of the data source.

2. Description of the Related Art

There are well-known methods for capturing and storing explicit knowledge as data using a computer system. Common methods for storing data include databases, word-processor documents, text files, spread-sheets, and many other formats for storing and retrieving data. Oftentimes, such data is analyzed by various individuals (e.g., experts, technicians, managers, researchers, etc.), resulting in rich interpretive information referred to as tacit knowledge.

Generally, tacit knowledge is knowledge that is not made explicit. It may be highly personal, is oftentimes very transient, and usually requires joint, shared activities to be transmitted. Examples of tacit knowledge include subjective insights, intuitions, facts learned from conversational exchanges, and hunches. Despite its highly valuable quality, tacit knowledge is often only temporarily captured, for example, as cryptic notes in a lab notebook, discussions, conversations, instant messaging exchanges, e-mails messages, and other transient communications. Thus, because it is typically not captured systematically, tacit knowledge is often lost.

One approach to capture tacit knowledge is to create annotations about explicit data. Virtually any identifiable type of data appearing in a data source may be annotated, including, a matrix of data such as a spreadsheet or database table, a text document, an image, or multi-media data. Further, sub-portions of objects (sub-objects) may be annotated, for example, an individual cell, row or column in a database table or a page, section, paragraph or word in a text document.

An annotation system stores descriptive information about objects, or parts of objects, without modifying the objects directly. An annotation store, typically a database, stores descriptive information for an annotation, and an indexing scheme maps each annotation to the object, or position within the object. An advanced annotation system, such as the one described in a commonly owned, co-pending application entitled "Universal Annotation Management System" U.S. Ser. No. 10/600,382 stores annotations separately from the corresponding data object and associates the annotations with an identifier that is location-independent. That is, the identifier does not depend on the location of a data source in a file system hierarchy or existence in a given database. Typically this identifier is derived from the document contents rather than from location artifacts such as filename, path, URL, etc.

Problems arise, however, when the contents of an annotated data source are changed. Oftentimes, the annotation created for the unmodified document is still useful for the modified document. For example, where a group of individuals collaborates on the contents of a data source, or where the modifications introduce additional content, and do not disturb the content that was originally annotated, the annotations should be carried forward to subsequent versions of the data source. The annotations, however, may refer only to the original data source, and not the modified version. Hence, annotations may become orphaned when an original document is modified.

One current method to prevent annotations from being orphaned involves storing the annotations directly within the document containing the annotated data. This solution, however, is not always possible, and more importantly, limits collaboration since a user who desires to view annotations must ensure that they are looking at the latest version of a document.

Another solution involves using a document management system to record and maintain associations between versions of a data source. The annotation system is configured to lookup annotations in other versions of a data source based on the version hierarchy stored by the document management system. The main drawback to this approach is that it imposes the strict use of a document management system which requires users to formally check-in and check-out documents, and also imposes other heavy processes that consume system resources.

Accordingly, there remains a need for techniques to provide an annotation system that manages annotations created for different versions of a data source that do not depend on storing the annotations with the data source. Such techniques should also lack the complexity and requirements imposed by a complex document management system.

SUMMARY OF THE INVENTION

The present invention generally provides methods, systems, and articles of manufacture providing an annotation system that manages annotations created for different versions of a data source family. Annotations created for one version of a data source may be viewed in context from both subsequent and prior versions of the same data source.

Generally, embodiments of the invention associate annotations with both a data source "family identifier" (family ID) as well as a "version identifier" (version ID) where the family ID is an identifier that is embedded in the data source. Other than adding the family ID to the data source, the data source may remain unchanged by the annotation system. The family ID is maintained across different versions of the data source, whereas version IDs are determined for a specific version of the data source. Version IDs can be constructed from each data source directly, and do not need to be stored.

One embodiment of the invention provides a method for associating annotations with a data source family. The method generally includes, receiving a request to create a first annotation for data content in an initial version of a data source; generating a family identifier, wherein the family identifier is associated with the initial version of the data source and with subsequent versions of the data source, and obtaining annotation content for a first annotation associated with a portion of data content in the initial version of the data source. The method generally further includes, associating the first annotation with the family identifier and with the initial version of the data source; and storing the family identifier in the initial version of the data source.

Another embodiment of the invention provides a method of displaying annotations created for different versions of a data source. The method generally includes determining a family identifier associated with the data source and determining a version identifier associated with the data source. The method generally further includes retrieving, from an annotation store, a set of one or more annotation records wherein each annotation record indicates the family identifier and the version identifier of the data source associated with the annotation record, and displaying, for each annotation record with a version identifier matching the version identifier associated with the data source, an indication that annotation content is available for data content in the data source.

Another embodiment of the invention provides a computer-readable medium containing a plurality of instructions that when executed on a computer system perform operations. The operations generally include receiving a request to create a first annotation for data content in an initial version of a data source, generating a family identifier, wherein the family identifier is associated with the initial version of the data source and with all subsequent versions of the data source, and obtaining annotation content for a first annotation associated with the data content in the initial version of the data source. The method generally further include, associating the first annotation with the family identifier and the initial version of the data source, and storing the family identifier in the initial version of the data source.

Another embodiment of the invention provides a computer-readable medium containing a plurality of instructions which, when executed on a computer system is configured to perform operations for displaying annotations created for different versions of a data source. The operations generally include determining a family identifier associated with the data source, and determining a version identifier associated with the data source. The operations generally further include retrieving, from an annotation store, a set of one or more annotation records wherein each annotation record indicates the family identifier and the version identifier of the data source associated with the annotation record, and displaying, for each annotation record with a version identifier matching the version identifier associated with the data source of the data source, an indication that annotation content is available for data content in the data source.

Another embodiment of the invention provides a system for managing annotations for multiple versions of a data source. The system generally includes an annotation management application configured to associate different versions of a data source with a common family identifier, a database used to store annotations created for the multiple versions of a data source; and an interface configured to display an indication of annotations created for a current version of a data source and an indication of annotations created for other versions of the data source.

Another embodiment of the invention provides a system for managing annotations created for multiple versions of a data source. The system generally includes an annotation management application configured to associate different versions of the data source with a common family identifier and to associate annotations created for the data source with both a family identifier and a version identifier, a database used to store annotations created for the multiple versions of a data source, and an interface configured to display an indication of annotations created for a current version of a data source, and configured to display an indication of annotations created for other versions of the data source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments as illustrated by the appended drawings.

The appended drawings, however, illustrate only typical embodiments of the invention and should not, therefore, be considered limiting of its scope, for the invention may admit to other equally effective embodiments.

DETAILED DESCRIPTION OF THE PREFERRED EMBODIMENTS

Figure 1:
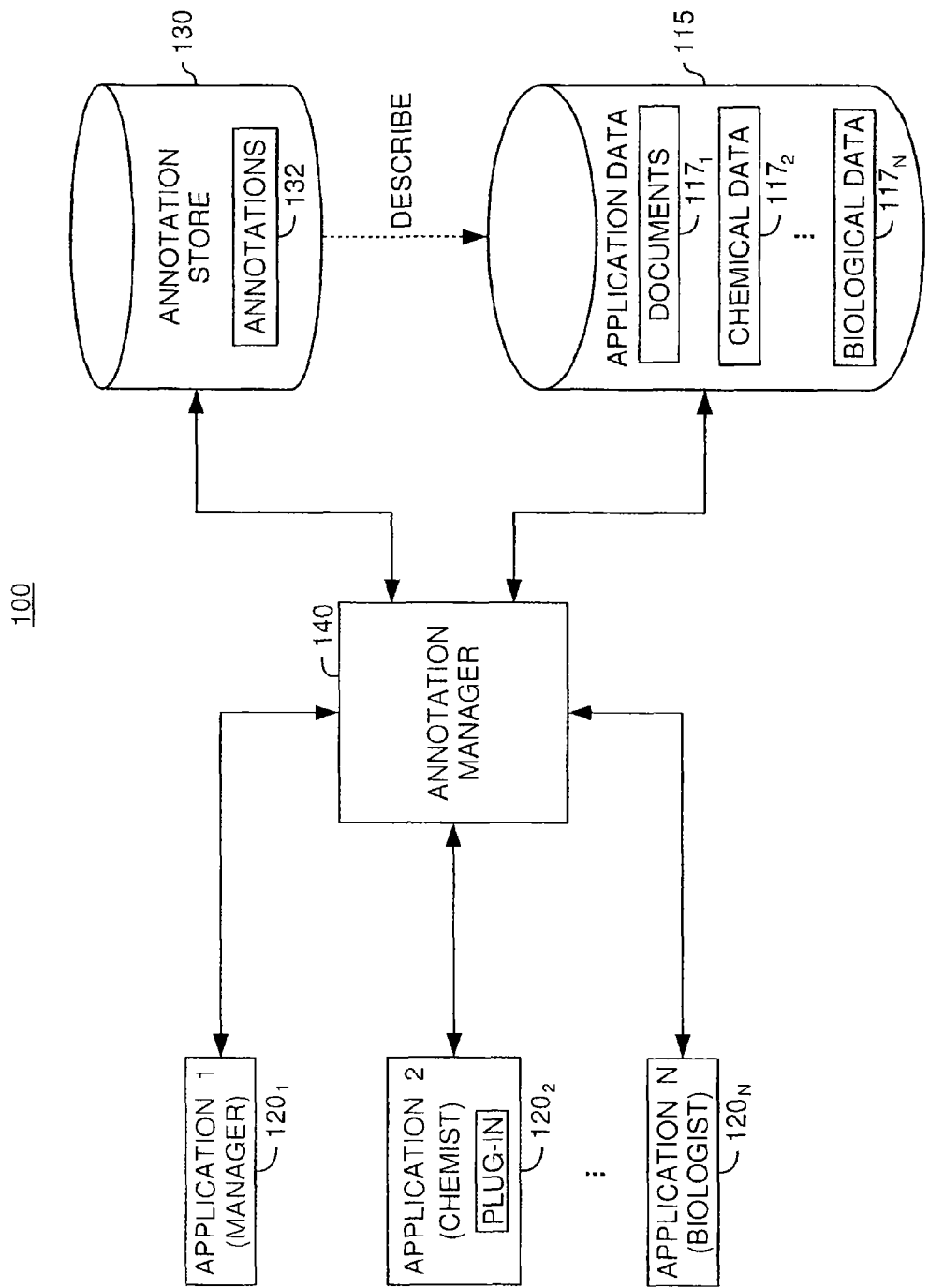
FIG. 1 illustrates an exemplary computing environment, according to one embodiment of the invention.

Embodiments of the invention provide methods, systems, and articles of manufacture for managing an annotation system that includes annotations created for multiple versions of a data source (i.e., a data source that begins with an initial version and is subsequently modified to create a family of versions). Annotations created for one version of the data source may be viewed in context from both subsequent and prior versions of the same data source.

Embodiments of the invention associate annotations with both a data source "family identifier" (family ID) as well as a "version identifier" (version ID) where the family ID is an identifier that is embedded in the data source. Other than adding a family ID to the data source, the data source remains unchanged by the annotation system. The family ID is maintained across different versions of the data source, whereas version IDs are determined for a specific version of the data source. Version IDs can be constructed from each document directly, and do not need to be stored.

When annotations are created, the family ID is retrieved from the data source (or one is created if none exists). Annotations are associates with both the specific version of the document (through the version ID) and to the family ID. When annotations are retrieved for a data source, a query for the family ID will return all annotations created for any version of the data source. In one embodiment, annotations may include metadata that indicates both the family ID and the version ID for the annotation. Further, one annotation may reference multiple version IDs. This allows users to distinguish between annotations created for the current version and annotations from other versions. In one embodiment, annotations created for the current version are displayed relative to the annotated content of the current version using an icon display. Annotations created for other versions may be viewed in context by displaying the other version of the data source associated with the annotation alongside the current version of the data source.

As used herein, the term annotation generally refers to any type of descriptive information associated with data elements in a data source. Annotations may be captured in a variety of forms, including textual annotations (descriptions, revisions, clarifications, comments, instructions, etc.), graphical annotations (pictures, symbols, etc.) or sound recordings. While an annotation may exist in any of these forms, embodiments of the invention may be described below with reference to textual annotations as a particular, but not limiting, example of an annotation. Accordingly, as persons of ordinary skill in the art will understand, the following techniques described with reference to textual annotations made for a document (e.g., a document created using word-processing software) may also be applied to other types of annotations.

As used herein, the term "data source" refers to any type of content containing data object, including without limitation, text documents, database records, database tables, spreadsheets, schematics, images, multi-media, and any other data source used by an application program to create manage, edit, store, view and/or analyze data. To help provide an understanding of the invention, embodiments of the invention are described using a document as a particular type of data source. While the following description may refer to a graphical user interface (GUI), those of ordinary skill in the art will understand that the same functionality may be provided through a non-graphical user interface, such as a command line, and further, that similar information may be exchanged between automated agents (e.g. a software daemon configured to generate annotations) via an automated interface.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other large computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Physical View of the Annotation Environment

FIG. 1 illustrates an exemplary system 100 including an annotation management application 140, according to one embodiment of the invention. The universal annotation system 100 may be provided to enterprise users, for example, from a service provider in the business of installing such systems. In an effort to ensure successful deployment of the annotation system 100, the service provider may address both the capture and harvest (retrieval) of tacit knowledge in the form of annotations 132. The capture process generally involves users (e.g., people or, in some cases, application programs) entering annotation content about an item of "target" data. Once captured in the form of an annotation 132, annotations may be stored in annotation store 130.

Users typically create annotations by interacting with software that may be embedded within their particular applications (e.g., as a plug-in component illustrated for application $120_2$) or, alternatively, with a separate annotation application that is external to their applications, for example, a stand-alone browser or custom application.

The annotations 132 may be stored in a central annotation repository such as annotation store 130, which may be searched either independently or in conjunction with the annotated data. Annotations 132 describe various data sources, such as documents $117_1$ generated by the manager with a first application 120, (e.g., a word processor), chemical data $117_2$ manipulated by a chemist with a second application $120_2$ (e.g., a database application), and biological data $117_N$ (e.g., genomic data) generated by a biologist with an $N^{th}$ application $120_N$ (e.g., a custom application).

Figure 2:
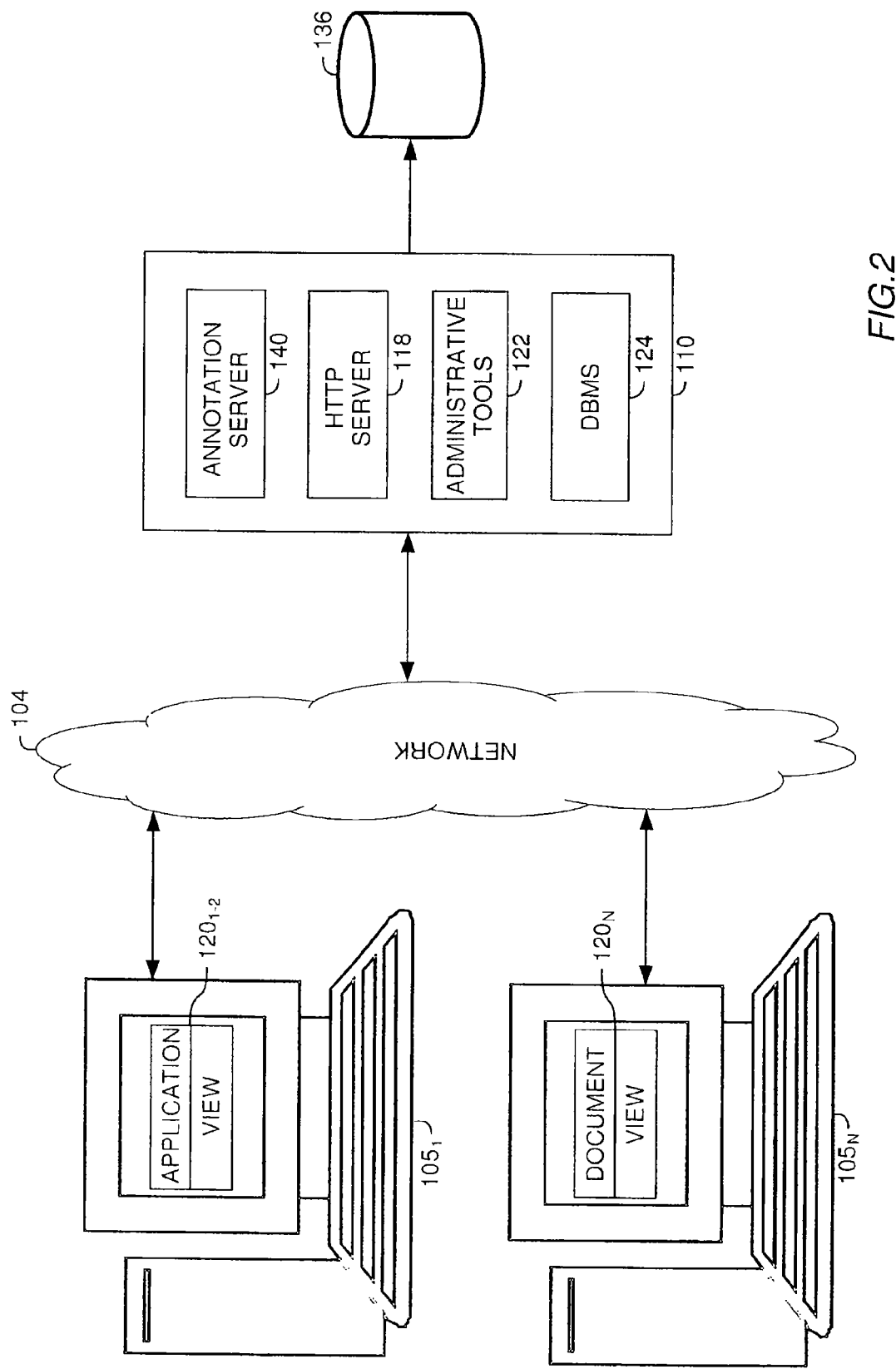
FIG. 2 illustrates a client server view of an annotation system, according to one embodiment of the invention.

FIG. 2 illustrates a networked computer system in a client-server configuration. Client computer systems $105_{1-N}$ include a network interface allowing communication with server system 110 over network 104. The network 104 may comprise a local area network wherein both the client systems 105 and server system 110 reside in the same general location, or may comprise network connections between geographically distributed systems, including network connections over the Internet. Network connections may be established over physical and wireless links using well known communication protocols. Client systems 105 generally include a central processing unit (CPU) connected via a bus, to memory and storage (not shown). Client systems 105 are running an operating system, (e.g., a Linux® distribution, Microsoft Windows®, International Business Machines' (IBM) AIX®, or Macintosh OSX®) that manages the interaction between hardware components and higher-level software applications running on client system 105.

In one embodiment, a user establishes a network connection between client system 105 and annotation server system 110. Such a connection may include a login process wherein a user authenticates the user's identity to the server system 110 using, for example, a username and password or other authentication schemes (e.g., digital certificates or biometric authentication). Systems that do not require authentication are also contemplated.

The server system 110 may include hardware components similar to those used by client system 105. Accordingly, the server system 110 generally includes a CPU, a memory, and a storage device, coupled one another by a bus. The server system 110 is also running an operating system, (e.g., a Linux® distribution, Microsoft Windows®, IBM's AIX® or OS/400, FreeBSD, and the like) that manages the interaction between hardware components and higher-level software applications.

The client/server configuration illustrated in FIG. 2, however, is merely exemplary of one hardware/software configuration. Embodiments of the present invention may be implemented using other configurations, regardless of whether the computer systems are complex multi-user computing systems, such as a cluster of individual computers connected by a high-speed network that acts as a single system, single-user workstations, or network appliances lacking non-volatile storage of their own. Additionally, although described herein using a client/server configuration, embodiments employing distributed computing or peer-to-peer networking techniques are contemplated.

In one embodiment, users interact with the server system 110 using a graphical user interface (GUI). In a particular embodiment, GUI content may comprise HTML documents (i.e., web-pages) rendered on a client computer system $105_1$. In such case, application 120 may comprise a known web-browser. In such an embodiment, the server system 110 includes a Hypertext Transfer Protocol (http) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically in response to HTTP requests from client system 105.

As illustrated in FIG. 2, server system 110 may further include administrative tools 122 and a database management system (DBMS) 124. Each of these components may comprise a software program executing on the server system 110. The DBMS server 124 (or servers) generally comprises a software application configured to manage databases, including the annotation store 130. For some embodiments, the annotation management application 140, and various related components, may be configured via a set of administrative tools 122. For example, the administrative tools 122 may be used to generate a set of annotation configuration files. In one embodiment, the annotation server 140 comprises the software process configured to provide annotation functionally to users interacting with applications 120. The annotation server 140 includes routines to create, identify and store annotations. Additionally, the annotation server 140 may be configured to communicate with HTTP server 118 and DBMS server 124 using well known inter-process communication techniques.

Figure 3:
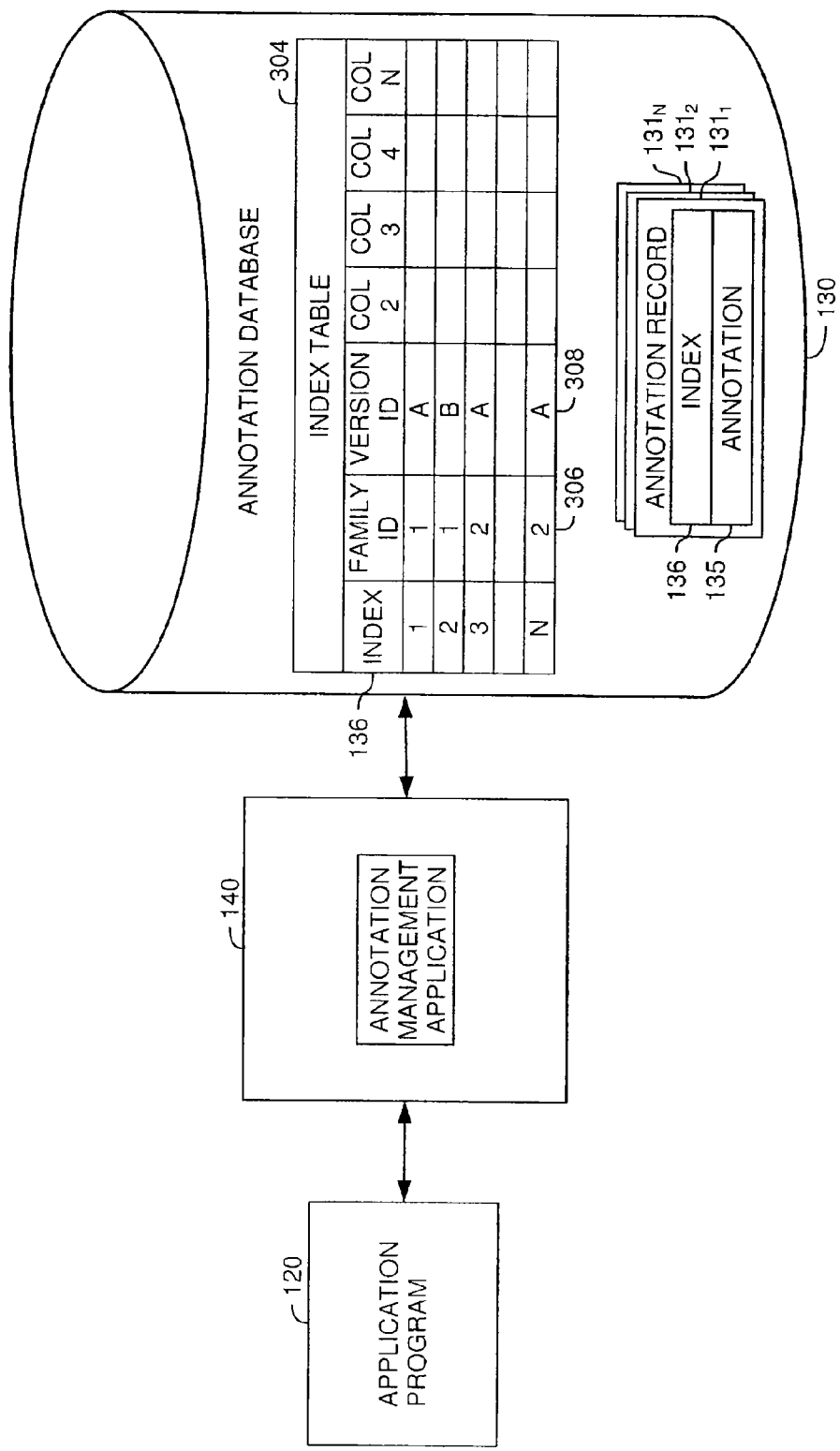
FIG. 3 illustrates a relational view of an annotation system in communication with an application program and annotation database, according to one embodiment of the invention.

FIG. 3 illustrates an annotation database 130. In one embodiment, a user creates an annotation for an item of data in a document accessed by application 120. The annotation manager 140 receives annotation content and stores it in annotation store 130. In one embodiment, annotation store 130 may include index table 304 that stores an index value 136, the Family ID 306, version ID 308 and any other metadata (illustrated by columns 2-N) for each annotation. For example, additional annotation metadata may indicate a point within the document (such as a page, paragraph, and line number for a text document) that identifies the data element within the document that is annotated by the annotation. An annotation record 131 may comprise the index value 136 for the annotation and the annotation content 135. The annotation record may also include a pointer to a copy of version of the document for which the annotation was created, that is, the annotation database may also store a copy of each version for each version of a document for which annotations are created. The relationship between an annotation index 136 and a document need not be one-to-one, however, and one annotation may be indexed to multiple versions of a document within a document family. Alternatively, the same annotation may appear with multiple indexes, each one associated with a different version of a document. Annotation database 130 may be part of the annotation server process, or may comprise a separate database managed by DBMS 124.

Each family ID may comprise a unique value generated for a document family. As used herein, a document family generally comprises successive versions of a document. Each time the document is modified (i.e., new content is added, current content removed, or some combination thereof) a new version ID is generated for the document, and the family ID is associated with the new version. In one embodiment, the version ID may be generated dynamically when needed form a particular version of the document. For example, a version ID may comprise a hash value such as an MD5 or SHA1 hash of the current version of the document in the document family. The family ID may comprise a universally unique identifier such as an OID or GUID. Alternatively, a hash value corresponding to the first version of the document may be used as the family ID. Whether generated using hash functions or GUID values however, the family ID is associated with all versions of a document for a given family, and the version IDs are unique to each version of a document. To facilitate the description of the invention, simple character identifiers are used to represent family and version IDs.

Figure 4A:
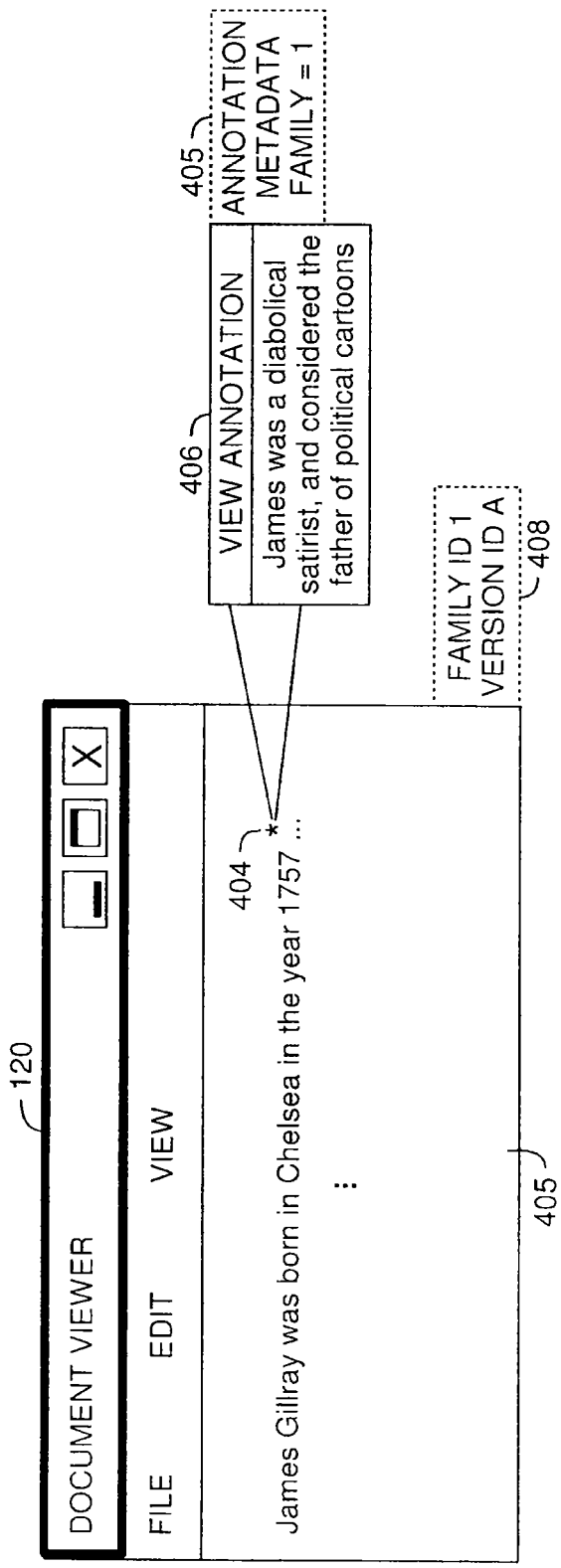
FIG. 4A illustrates a graphical user interface that displays an original version of a document that includes annotations created for the document, according to one embodiment of the invention.

FIG. 4A illustrates an exemplary GUI interface screen 402 displayed to a user interacting with application 120. In this example, the screen shows text content 405. In addition, the presence of an annotation for data in the document is indicated by annotation icon 404. In an embodiment where annotations are managed using a web-based interface, the annotation icon may include a hyperlink. When clicked, the hyperlink causes a view annotation window 406 to open. In various embodiments, annotations associated with a document may be identified each time a user accesses a document, or in response to a user request to view annotations. Techniques for managing annotations are illustrated in detail in a commonly owned co-pending application entitled commonly owned, co-pending U.S. patent application, U.S. Ser. No. 10/600,014, filed Jun. 20, 2003, entitled, "Universal Annotation Management System" U.S. incorporated by reference in its entirety. In addition, version metadata 408 (not displayed to a user, as represented by the dashed lines) corresponding to the document viewed by application 120 is stored with the document being viewed. In one embodiment, this metadata may include the associated family ID indicating the family associated with the document, as well as the version ID associated with the current document. The version metadata corresponds to annotation metadata 405 which indicates that the annotation 406 is associated with the document family "1" and version "A."

Figure 4B:
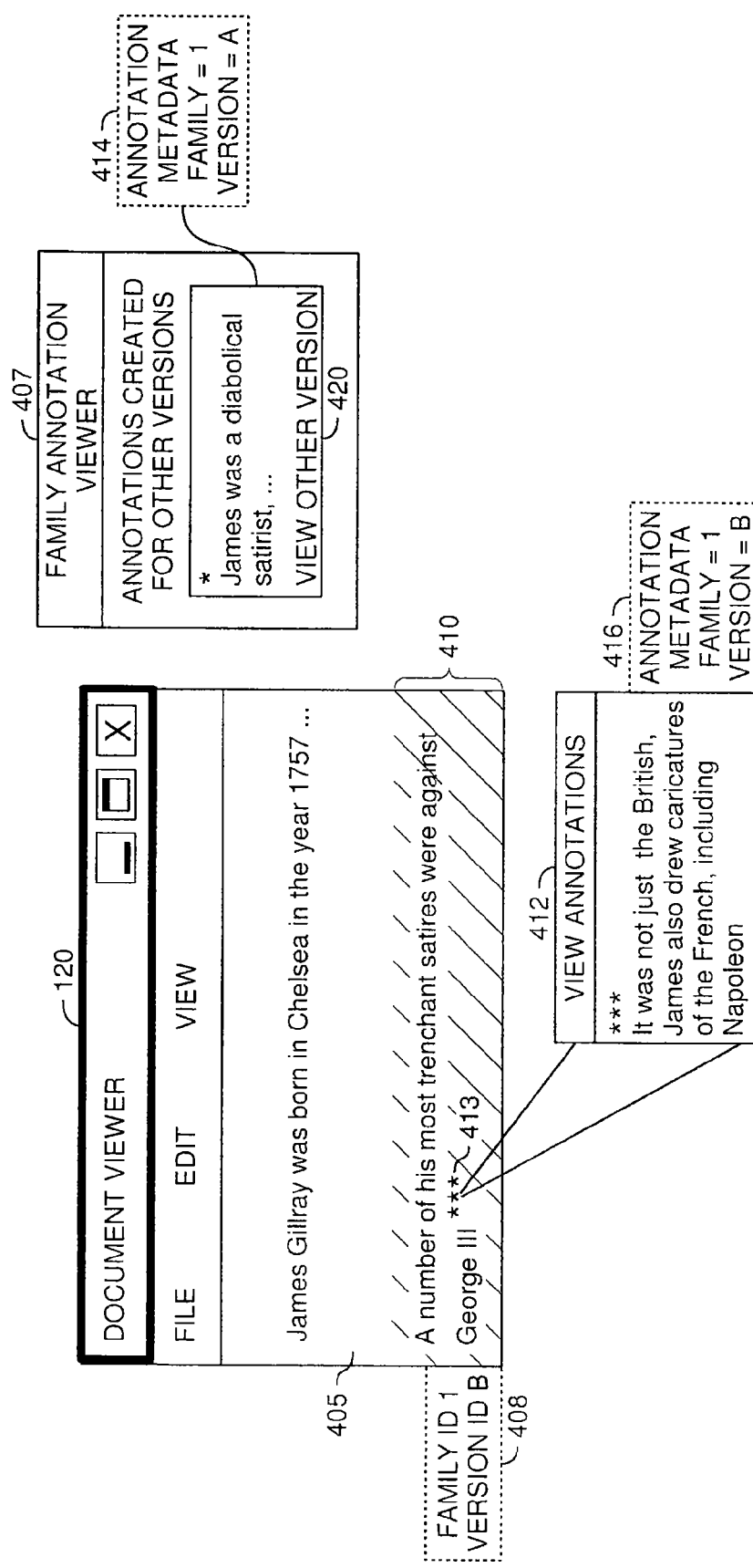
FIG. 4B illustrates the document from FIG. 4A after modification and additional annotations have been created, according to one embodiment of the invention.

FIG. 4B illustrates the same GUI screen 402 displayed on application 120, after being modified, as illustrated by added content 410 and new annotation 412 indicated by annotation icon 413. Because the document is modified, the version ID has been incremented. Accordingly, the version ID illustrated in FIG. 4B is different than the version ID illustrated in FIG. 4A. However, because both versions are part of the same document family, the Family ID remains the same. Annotation 412 is an annotation created for the second version of the document. Note, however, the annotation icon displayed in FIG. 4A is not displayed as part of the document display 405 in FIG. 4B. This occurs because the version ID (namely, version "A" shown by annotation metadata 414) associated with the annotation 406 is different than the version ID for document 405 (namely, "B" after the modifications) identified version metadata 408. In one embodiment, family annotation display 407 may be used to indicate that annotations are available for prior (or subsequent) versions of the current document being accessed by application 120. As illustrated, family annotation display window 407 includes link 420. Depending on the changes made between versions, the data that was annotated by the annotation may no longer exist in the current document. In one embodiment, the family annotation display window 407 allows a user to view annotations created for other versions of the current document, in their original context, using the version of the document for which they were created by displaying the annotated content from the other version of the document.

Figure 5:
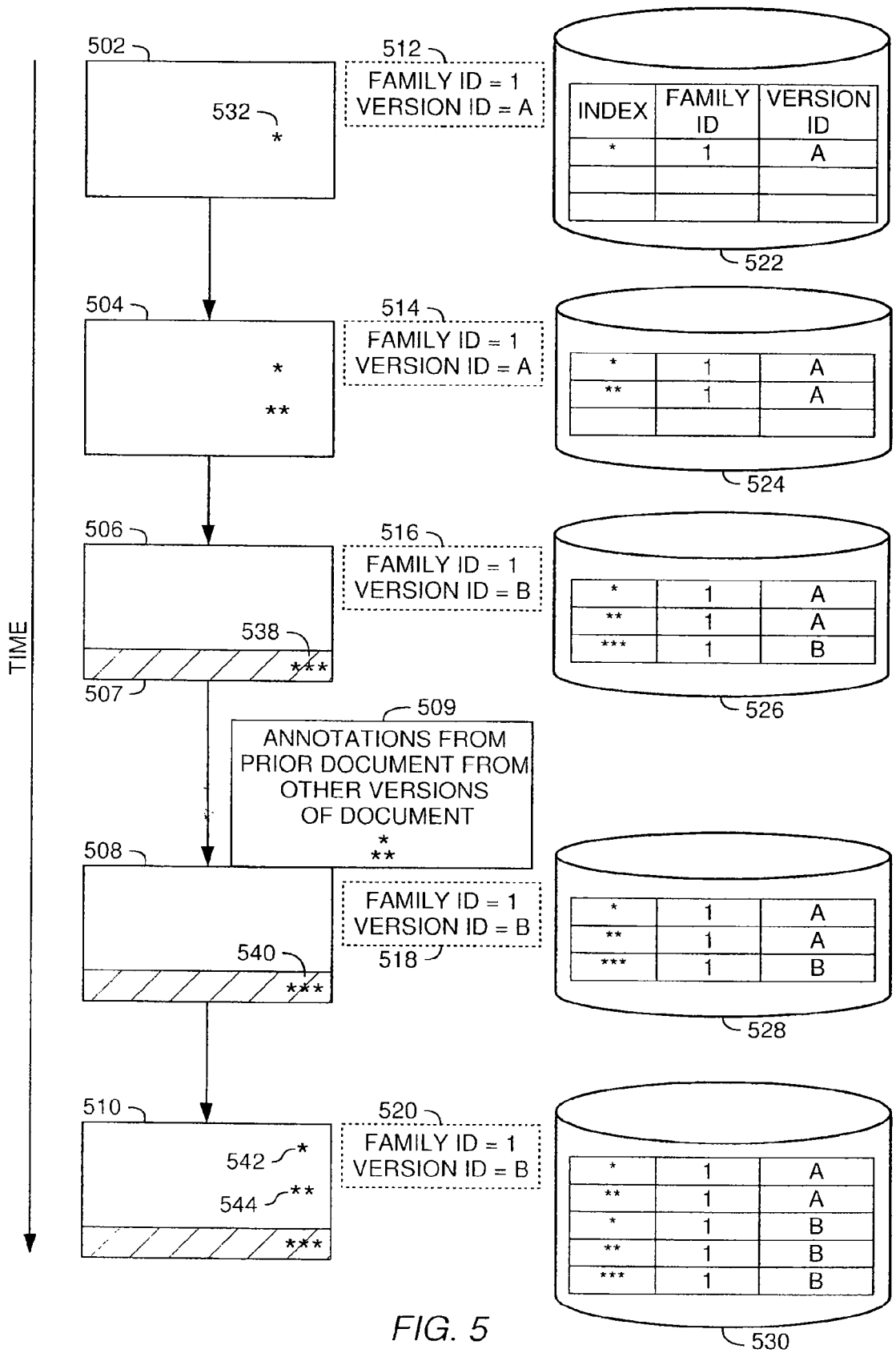
FIG. 5 illustrates a time-lapse view of a document that includes the state of annotations created for the document and an annotation database used to store annotations created for the document family associated with the document, according to one embodiment of the invention.

FIG. 5 illustrates a time-lapse view of a document as it undergoes a series of modifications made to the document (document states 502-510), the state of the annotation metadata for each version of the document (metadata 512-520), and information stored in the annotation database (states 522-530). The initial version of the document 502 is the original version. Associated with this version, and all subsequent versions, is the family ID of "1" stored in document metadata (states 512-520). For convenience, as illustrated in FIG. 5, annotations are indicated using "*" symbols.

Initially, at state 502, the document metadata 512 indicates family ID "1" and version ID "A." The document contains a single annotation 532. These IDs are reflected in the annotation store at 522. At document state 504, a second annotation 534 is added to the document, and the annotation store 534 is updated with the second annotation. The version ID in metadata 514 remains unchanged at state 504, because no changes are made to document 504, only to the annotations. In one embodiment, annotations are stored independently from the document, and adding annotations to an uncharged document do not require an update to the version ID.

Subsequently, new content 507 is added to the document at state 506. Once the document is modified and saved, the version ID "A" is longer valid. Accordingly, the annotation manager 140 may be configured to update the version ID stored with annotation metadata with a new version ID. In one embodiment, the annotation manager also saves a copy of the new document version. Doing so allows annotations created for a given version to be displayed in context of that version. As illustrated, the Version ID stored in metadata 516 is updated to "B," at state 506. Also, the first and second annotations created for the prior version are no longer displayed with the document because the version ID corresponding to these annotations refers to a prior version ID (namely, version ID "A"). Further, the state 506 includes a third annotation 538. As illustrated, the third annotation 538 is created for data from new content 507, however, annotations may be created for any portion of the document 506.

Annotation store 526 includes the first and second annotations, indexed to the prior document version ID, along with the third annotation. If a user accesses the prior version and requests annotations, the annotation server 140 will return the "*" and "**" annotations. All three annotations are indexed to the same document family ID, "1", and a query for all of the annotations in the document family will return annotations "*", "", and "*." At state 508, the document includes the view prior annotations display 509 from FIG. 4B. This display allows a user to review annotations from other versions of the document. Depending on the version of a document being accessed, the display 509 may include annotations created for both prior versions and subsequent versions of the document.

In one embodiment, a user interacting with the annotation manager 140 may choose to associate annotations from other versions of the document with the current one. Accordingly, document state 510 illustrates the document with annotation 542 and 544 which represent the annotations from document state 504 re-associated with the current document. As illustrated, the database store 530 includes index for annotation "*" and "**" for both the "A" version of the document and the "B" version of the document. In one embodiment, when an annotation is associated with the current version of the document, it is no longer displayed in the display area 509.

Operational Methods

Figure 6A:
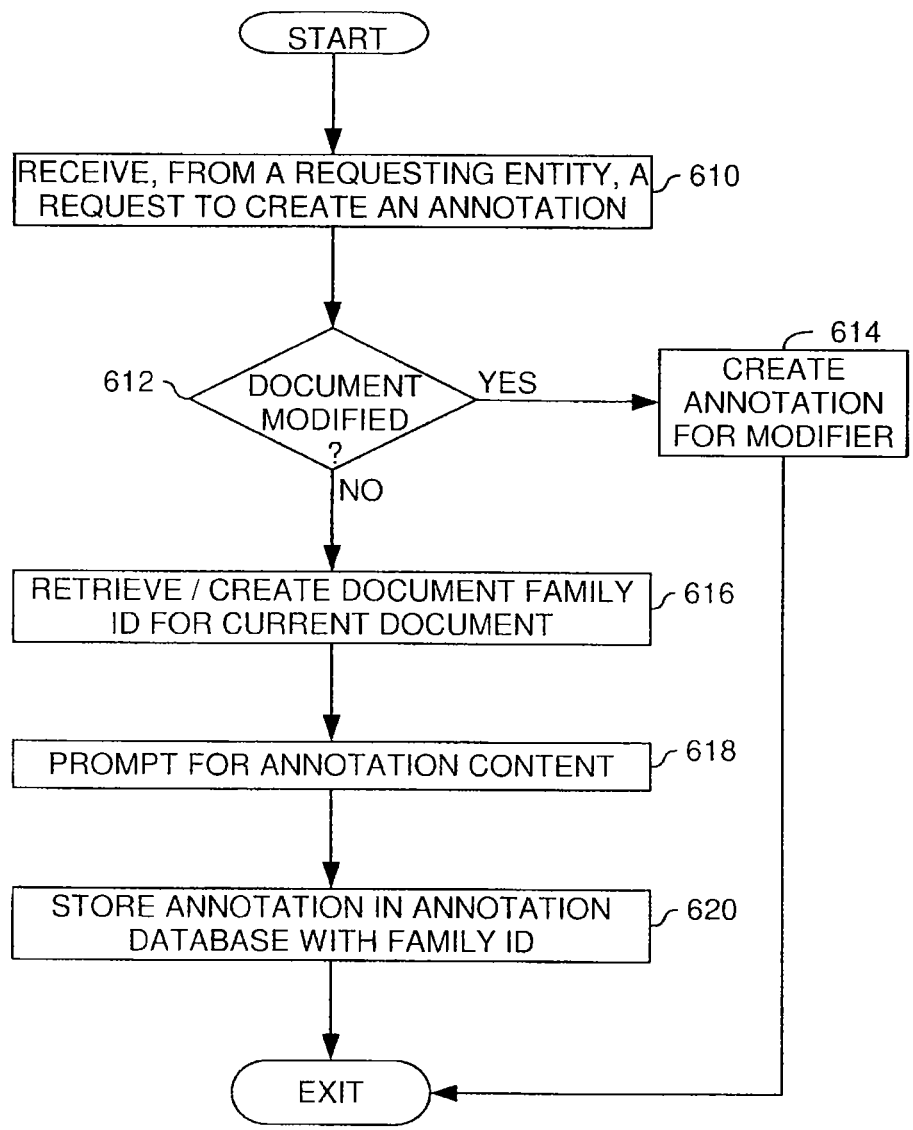
FIG. 6A illustrates a method for creating an annotation for a data source, according to one embodiment of the present invention.

FIG. 6A illustrates a method 600 to add annotations to a current version of a document, according to one embodiment of the invention. The method begins at step 610 where the annotation manager 140 receives a request to create an annotation for data content present in a current version of a document. For example, a user interacting with a word processing application may desire to annotate a passage of text appearing in the document. At step 612, the method queries whether the document being accessed has been modified. If so, the method moves to step 614, further illustrated in FIG. 6B. Otherwise, the method proceeds to step 616 where the annotation manager 140 retrieves the family and version ID for the current document. If this is the first time an annotation has been created for the document, then the annotation manger 140 may generate a family ID and associate it with the document. Next, the user is prompted to provide annotation content. For example, a user may indicate what data content is being annotated, as well as the content of the annotation. At step 620, the annotation content may be added to the annotation store, and stored with the appropriate family ID, and version ID in index table 304.

Figure 6B:
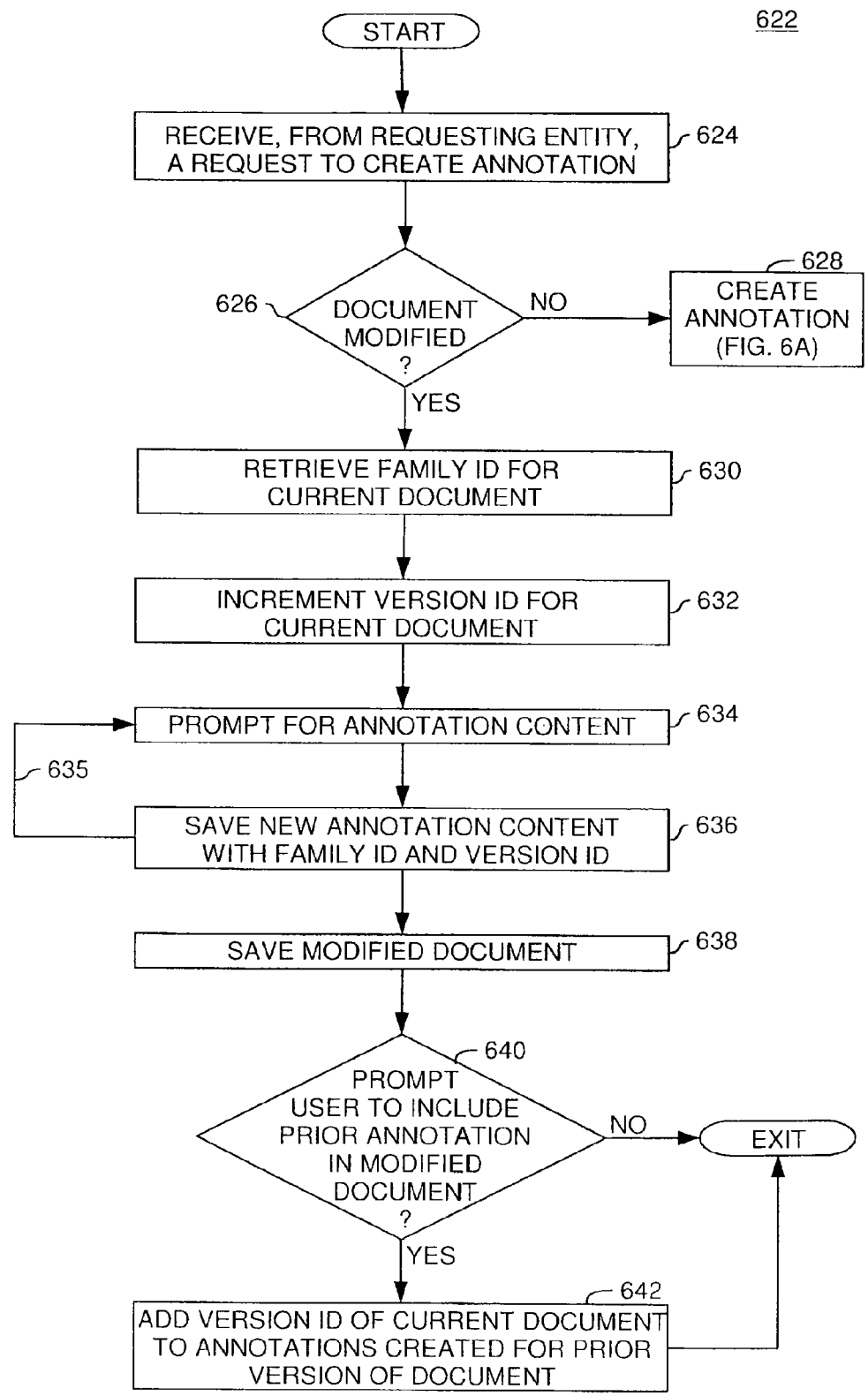
FIG. 6B illustrates another method for creating an annotation for a modified version of a data source, according to one embodiment of the present invention.

FIG. 6B illustrates a method to create an annotation for a modified version of a current document. Like method 600, operations 622 begin at step 624 where the annotation manager 140 receives a request to create an annotation for data content present in a current document. At step 626, the method 622 queries whether the document being accessed has been modified. If not, then, at step 628, an annotation may be created according to the method illustrated in FIG. 6A. Next, if the document has been modified, the annotation manager 140 retrieves the family ID and for the document. Because the document has been modified, a new version ID is assigned to the current document at step 632.

At step 634, the annotation manager 140 prompts a user for new annotation content. At step 636, the new annotation is stored in the annotation store with the family ID and new version ID. While the user interacts with the document, additional new annotations may be created. Thus, loop 635 illustrates that step 634 and step 636 may be repeated. One a user has finished modifying a document, the modified document is saved. Optionally, at step 640, the annotation manager 140 may prompt the user to selectively choose which annotations from the previous version are still relevant to the modified version. At step 642, if the user has chosen to include any annotations from a prior version into the current version of the document, then any selected annotations are modified to include a reference to the version ID of the current document. Alternatively, a new annotation (copying the annotation from the other version) may be created that includes the version ID from the current document, e.g., the "*" and "**" duplicated for both versions of the document in annotation store 530.

Figure 6C:
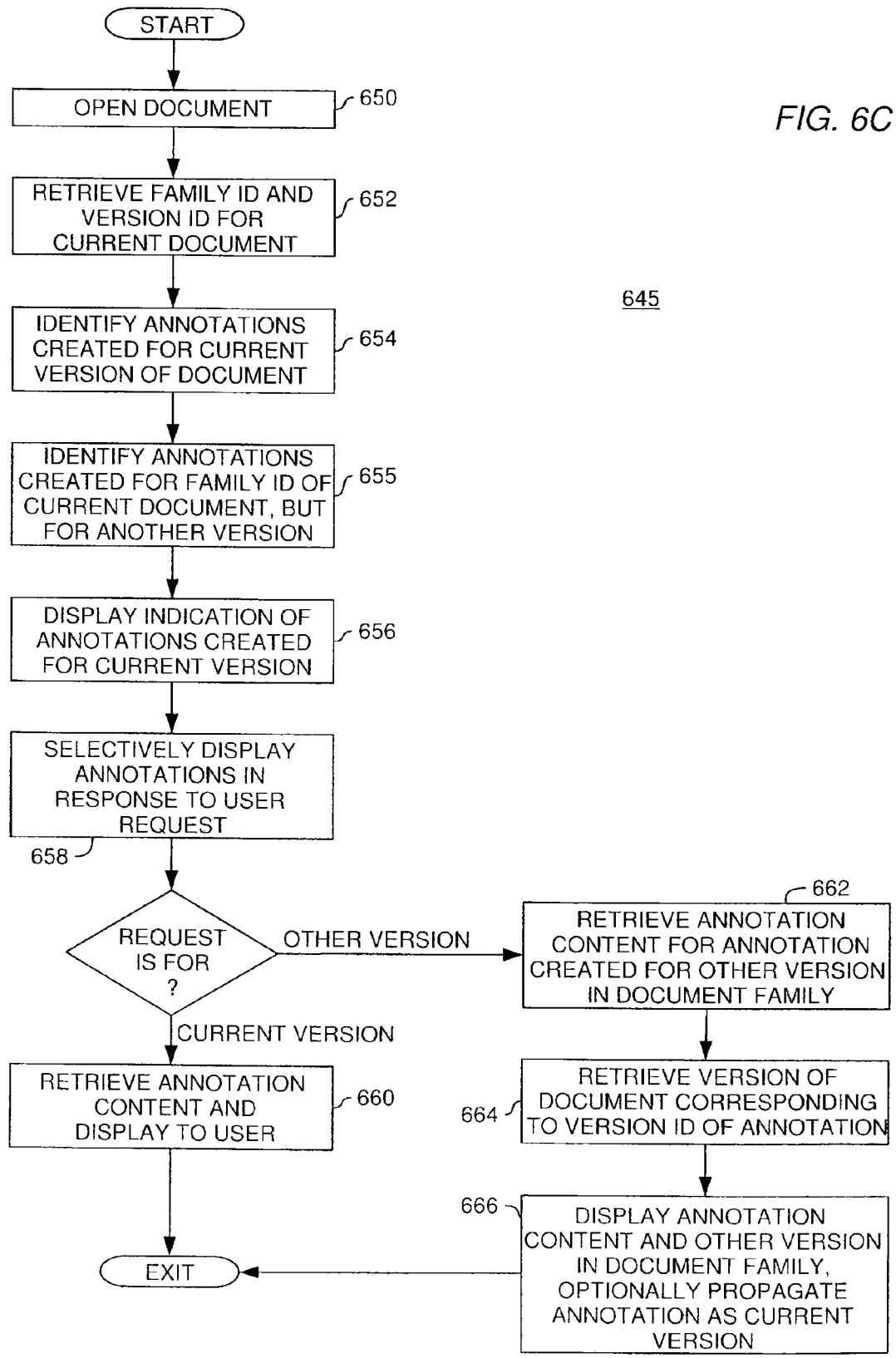
FIG. 6C illustrates a method for viewing annotations created for different versions of a document family, according to one embodiment of the invention.

FIG. 6C illustrates a method 645 for viewing annotations created for different versions of a document family, including the current version, according to one embodiment of the invention. The method 645 begins at step 650 when a user opens a document. At step 652, the annotation manager retrieves the family ID for the document. In one embodiment, this step may occur each time a user access a document for which annotations may be created. If the document opened at step 650 does not have an associated family ID, then no annotations have been created for the document. If the document has a family ID, then the version ID for the current document is also determined. At step 654, the annotation manger 140 identifies annotations created for the current version of the document by matching the version ID with the version IDs of annotations in the annotation store.

At step 655, annotations created for other versions of the document are identified. That is, at step 655, annotations created for prior, or subsequent, versions of the current document are identified by identifying annotations with a matching family ID, but different version IDs.

At step 656, an indication of annotations identified at steps 654 and 655 are displayed. In an environment employing a graphical user interface, this may include displaying an annotation icon at the point in the data source corresponding to the annotation. In one embodiment, an annotation icon may comprise an image displayed for an anchor tag in an HTML document like the following:

```
<A href=http://annotations.ibm.com/retreive_global.php?index=1729/>
<IMG SRC=icon.gif" WIDTH="15" HEIGHT="15" BORDER="0">
</A>
```

This way, the annotation ID, 1729 in this example, is encoded into the display of the document. Doing so simplifies the annotation retrieval process and improves the efficiency of the annotation manger running 140 on server system 110.

Also, at step 656 an indication of the availability of annotations from other versions is displayed. For example, the prior annotation window illustrated in FIG. 4B may be displayed. Alternately, a user may request an indication of prior annotations using a menu selection or GUI interface button associated with the annotation manger 140 or application 120. At step 658, annotation content, for both the current version (step 660), or other versions (steps 662-666) are displayed in response to a user request to view annotation content.

If a user requests to view an annotation created for the current version of the document (e.g., clicks on an annotation icon displayed at step 656), then at step 660, the annotation corresponding to the index value encoded in the icon is used to retrieve the annotation from the annotation store 630. If a user requests to view an annotation created for a different version of the document in the document family, then at step 662, the annotation created for the another version is retrieved. In addition, at step 664, the annotation manger 140 may be configured to retrieve the version of the document in the document family used to create the annotation at step 662. Doing so allows a user to view an annotation from another version of the current document in the same context that it was created. Next at step 666, a user may choose to associate an annotation originally created for a different version of the document in the family with the version ID of the current document.

Conclusion

By associating annotations with both a family ID and a version ID, embodiments of the invention provide a convenient annotation system that manages annotations created for a document family. Users may view annotations for the current version of a document, as well as annotations created for prior, or subsequent, versions of the same document. Because these annotations may still be useful for the current document, users may selective choose to associate annotations from other versions with the current version of a document.

While the foregoing is directed to embodiments of the present invention, other and further embodiments of the invention may be devised without departing from the basic scope thereof, and the scope thereof is determined by the claims that follow.

What is claimed is:

1. A method of displaying annotations created for different versions of a document comprising:
   determining, by operation of one or more processors, a family identifier associated with the document, having an initial version and one or more subsequent versions, wherein the family identifier is associated with the initial version of the document and with the one or more subsequent versions, and wherein each subsequent version of the document modifies textual content of the document relative to other versions;
   determining, by operation of the one or more processors, a version identifier associated with one of the versions of the document, wherein the version identifier provides an indication of either the initial version or a given one of the subsequent versions of the document;
   retrieving, from an annotation store, a set of one or more annotation records wherein each retrieved annotation record indicates the family identifier and the determined version identifier of the document
   displaying, for each annotation record with a version identifier matching the determined version identifier, an indication that annotation content is available for a text passage in the version of the document associated with the determined version identifier;
   retrieving, from the annotation store, at least a first annotation record, wherein the first annotation record has a version identifier that does not match the determined version identifier;
   upon determining that the first annotation record is associated with annotated content not present in the document associated with the determined version identifier, displaying an indication that annotated content is available for the text content not present in the document associated with the determined version identifier;

upon request, displaying the annotation content associated with the first annotation along with annotated content from a version of the document associated with the first annotation; and selecting at least one annotation record with a matching family identifier but non-matching version identifier to associate with the determined version of the document.

2. The method of claim 1, wherein the family identifier comprises a hash value generated from a SHA-1, MD5, or other hash algorithm.

3. A non-transitory computer-readable storage medium containing a plurality of instructions which, when executed on a computer system is configured to perform operations comprising of displaying annotations created for different versions of a document, comprising:

determining a family identifier associated with the document, having an initial version and one or more subsequent versions, wherein the family identifier is associated with the initial version and with the one or more subsequent versions, and wherein each subsequent version of the document modifies textual content of the document relative to other versions;

determining a version identifier associated with one of the versions of the document, wherein the version identifier provides an indication of either the initial version or a given one of the subsequent versions of the document;

retrieving, from an annotation store, a set of one or more annotation records wherein each retrieved annotation record indicates the family identifier and the determined version identifier of the document;

displaying, for each annotation record with a version identifier matching the determined version identifier, an indication that annotation content is available for a text passage in the version of the document associated with the determined version identifier;

retrieving, from the annotation store, at least a first annotation record, wherein the first annotation record has a version identifier that does not match the determined version identifier;

upon determining that the first annotation record is associated with annotated content not present in the document associated with the determined version identifier, displaying an indication that annotated content is available for the text content not present in the document associated with the determined version identifier;

upon request, displaying the annotation content associated with the first annotation along with annotated content from a version of the document associated with the first annotation;

selecting at least one annotation record with a matching family identifier but non-matching version identifier to associate with the determined version of the document.

4. A system for managing annotations created for multiple versions of a document; comprising:

a processor;

a memory storing an annotation management application which when executed by the processor, is configured to associate different versions of the document with a common family identifier and to associate annotations created for the document with both a family identifier and a version identifier, wherein a version identifier corresponds to a particular one of the multiple versions of the document and wherein each of the multiple versions of the document modifies textual content of the document relative to other versions;

a database used to store annotations created for the multiple versions of the document, wherein the annotations each include annotation content and an indication of the version identifier corresponding to the version of the document for which a given annotation was composed;

an interface configured to display an indication of annotations created for a passage of text present in a specified version of a document and an indication of annotations created for other versions of the document, wherein the interface is further configured to, upon request, (i) display annotation content for annotations created for the passages of text present in the specified version of the document (ii) display both annotation content and content of the other versions of the document for the annotations created for the other versions of the document, and wherein the interface comprises, a first window configured to display the specified version of the document and an indication of annotations created for the specified version of the document and, in a second window, an indication of annotations created for other versions of the document.

5. The system of claim 4, wherein the document is selected from a spreadsheet, database table, text document, word processor document, image or combinations thereof.

6. The system of claim 4, wherein the family identifier comprises a hash value generated from a SHA-1, MD5, or other hash algorithm.

7. The system of claim 4, wherein the interface is further configured to display, in the second window, the version of the document for which the annotation was originally created.

* * * * *